United States Patent
Bokma et al.

(10) Patent No.: US 12,265,947 B2
(45) Date of Patent: Apr. 1, 2025

(54) REGION-SPECIFIC CONTENT CREATION

(71) Applicant: Salesforce, Inc., San Francisco, CA (US)

(72) Inventors: Scott Bokma, San Francisco, CA (US); Brian J. Lonsdorf, Moss Beach, CA (US); Sönke Rohde, San Francisco, CA (US); Alan Martin Ross, San Francisco, CA (US); Michael Sollami, Cambridge, MA (US); David Woodward, Mountain View, CA (US); Jessica Lundin, Bellevue, WA (US)

(73) Assignee: Salesforce, Inc., San Francisco, CA (US)

(*) Notice: Subject to any disclaimer, the term of this patent is extended or adjusted under 35 U.S.C. 154(b) by 246 days.

(21) Appl. No.: 17/811,273

(22) Filed: Jul. 7, 2022

(65) Prior Publication Data
US 2024/0013151 A1    Jan. 11, 2024

(51) Int. Cl.
G06Q 30/00    (2023.01)
G06Q 10/101   (2023.01)
G06T 11/60    (2006.01)

(52) U.S. Cl.
CPC ........... *G06Q 10/101* (2013.01); *G06T 11/60* (2013.01)

(58) Field of Classification Search
None
See application file for complete search history.

(56) References Cited

U.S. PATENT DOCUMENTS

| | | | |
|---|---|---|---|
| 8,271,837 B2 | 9/2012 | Prophete | |
| 8,407,184 B2 | 3/2013 | Prophete | |
| 9,660,821 B2 * | 5/2017 | Safa | G06F 21/6209 |
| D884,027 S | 5/2020 | Day | |
| 10,783,405 B2 | 9/2020 | Rohde | |
| 10,789,066 B1 | 9/2020 | Rohde | |

(Continued)

FOREIGN PATENT DOCUMENTS

| | | |
|---|---|---|
| AU | 2019349422 A1 | 4/2021 |
| CA | 3112952 A1 | 4/2020 |

(Continued)

OTHER PUBLICATIONS

Chyi, Hsiang, et al. "The Medium is Global, the Content is Not: The Role of Geography in Online Newspaper Markets." Journal of Media Economics, 14:4, pp. 231-248, 2009. (Year: 2009).*

(Continued)

*Primary Examiner* — Luis A Brown
(74) *Attorney, Agent, or Firm* — Kwan & Olynick LLP

(57) ABSTRACT

A method receives an input file. The input file includes a plurality of entries where different entries are associated with a different characteristic. A selection of a guide for an entry is determined where a guide includes guidelines for formatting content in an entry in the plurality of entries. The method performs analyzing an image from the entry to generate image variations. Then, the method analyzes the image and the image variations to place text items from the entry in the image and the image variations where the text items in the image and the image variations are formatted based on the guidelines in the guide for the entry. A plurality of design variants is generated for the entry based on the image and the image variations that include text items.

20 Claims, 10 Drawing Sheets

(56) References Cited

U.S. PATENT DOCUMENTS

| | | | |
|---|---|---|---|
| 10,928,982 | B2 | 2/2021 | Hou |
| D913,319 | S | 3/2021 | Day |
| 10,949,865 | B2 | 3/2021 | Rohde |
| 10,963,694 | B2 | 3/2021 | Rohde |
| D924,907 | S | 7/2021 | Day |
| 11,074,044 | B1 | 7/2021 | Schoppe |
| 11,093,486 | B2 | 8/2021 | Rohde |
| 11,137,985 | B2 | 10/2021 | Schoppe |
| 11,138,022 | B2 | 10/2021 | Rohde |
| 11,167,214 | B1 * | 11/2021 | White .................... G06N 3/006 |
| 11,172,271 | B1 * | 11/2021 | Vartakavi ............... G06N 20/00 |
| 11,182,135 | B2 | 11/2021 | Schoppe |
| 11,210,111 | B2 | 12/2021 | Rohde |
| 11,226,834 | B2 | 1/2022 | Andolina |
| 11,531,885 | B2 * | 12/2022 | Sollami ................. G06F 18/214 |
| 2002/0007383 | A1 * | 1/2002 | Yoden ................... G06F 40/143 715/205 |
| 2007/0079010 | A1 * | 4/2007 | Heredia .................. H04L 69/24 709/246 |
| 2008/0313533 | A1 * | 12/2008 | Hoyer ................... G06F 40/103 715/243 |
| 2012/0054020 | A1 * | 3/2012 | Jacobs ............... G06Q 30/0269 705/14.42 |
| 2012/0226823 | A1 * | 9/2012 | Livnat ..................... G06F 21/62 709/246 |
| 2017/0235807 | A1 | 8/2017 | Prophete |
| 2020/0097456 | A1 | 3/2020 | Tran |
| 2020/0097476 | A1 | 3/2020 | Tran |
| 2020/0097482 | A1 | 3/2020 | Woodward |
| 2020/0097562 | A1 * | 3/2020 | Addala .................... G06F 16/26 |
| 2020/0097570 | A1 * | 3/2020 | Sollami ................. G06F 16/248 |
| 2020/0341602 | A1 | 10/2020 | Schoppe |
| 2020/0341779 | A1 | 10/2020 | Rohde |
| 2020/0341780 | A1 | 10/2020 | Andolina |
| 2020/0341781 | A1 | 10/2020 | Schoppe |
| 2020/0387295 | A1 | 12/2020 | Schoppe |
| 2021/0103969 | A1 | 4/2021 | Sollami |
| 2021/0103970 | A1 | 4/2021 | Sollami |
| 2021/0117484 | A1 | 4/2021 | Sollami |
| 2021/0117773 | A1 * | 4/2021 | Sollami .................. G06N 3/084 |
| 2021/0118024 | A1 | 4/2021 | Sollami |
| 2021/0118149 | A1 | 4/2021 | Sollami |
| 2021/0149961 | A1 | 5/2021 | Lonsdorf |
| 2021/0240318 | A1 | 8/2021 | Schoppe |
| 2021/0240319 | A1 | 8/2021 | Schoppe |
| 2021/0240320 | A1 | 8/2021 | Woodward |
| 2021/0240452 | A1 * | 8/2021 | Schoppe ............. G06F 16/9577 |
| 2021/0240501 | A1 | 8/2021 | Woodward |
| 2021/0240910 | A1 | 8/2021 | Lundin |
| 2021/0334666 | A1 | 10/2021 | Lundin |
| 2022/0050667 | A1 | 2/2022 | Schoppe |
| 2022/0277136 | A1 * | 9/2022 | Shekhar ................ G06F 40/186 |

FOREIGN PATENT DOCUMENTS

| | | |
|---|---|---|
| CN | 112740228 A | 4/2021 |
| CN | 114174969 A | 3/2022 |
| EP | 3857444 A1 | 8/2021 |
| JP | 2022502753 A | 1/2022 |
| WO | 2020068647 A1 | 4/2020 |
| WO | 2021154496 A1 | 8/2021 |
| WO | 2021155242 A1 | 8/2021 |

OTHER PUBLICATIONS

Kresse, Wolfgang. "Standardization of Geographic Information." University of Applied Sciences, 2004. (Year: 2004).*

Alden, Dana, et al. "Brand Positioning Through Advertising in Asia, North America, and Europe: The Role of Global Consumer Culture." Journal of Marketing, vol. 63, No. 1, Jan. 1999. (Year: 1999).*

U.S. Appl. No. 17/162,245, filed Jan. 29, 2021, 47 pages.

U.S. Appl. No. 17/525,916, filed Nov. 14, 2021, 47 pages.

* cited by examiner

| | Region Code | Image | Headline | Body | CTA |
|---|---|---|---|---|---|
| 1 | | | | | |
| 2 | EN-US | | Best Selling Jackets | Jacket the pros trust | Shop Jackets |
| 3 | EN-UK | | Best Selling Jackets | Jacket the pros trust | Shop Jackets |
| 4 | DE | | Bestseller Jacken | Jacke, der Profis vertrauen | Jacken shoppen |
| 5 | FR | | Vestes les plus vendues | Veste à laquelle les pros font confiance | Magasinez les vestes |
| 6 | JP | | ベストセラージャケット | 究極の保護を手に入れよう | ショップジャケット |
| 7 | | | | | |

Figure 3

REGION-SPECIFIC CONTENT CREATION

FIELD OF TECHNOLOGY

This patent document relates generally to content generation.

BACKGROUND

A team may have to create content for different regions globally. For example, the team may require region-specific communication materials. However, available resources, such as designers to create the content, may not always be available because of budget, time constraints, or being allocated on other projects. Further, it requires a large amount of time and knowledge to create unified content across multiple regions, which may have different language requirements. These difficulties may restrict the team from generating the content that is needed in a timely manner or even generating the content at all, which may affect the distribution of content in the regions.

BRIEF DESCRIPTION OF THE DRAWINGS

The included drawings are for illustrative purposes and serve only to provide examples of possible structures and operations for the disclosed inventive systems, apparatus, methods and computer program products for content generation. These drawings in no way limit any changes in form and detail that may be made by one skilled in the art without departing from the spirit and scope of the disclosed implementations.

FIG. 3 depicts an example of an input file according to some embodiments.

DETAILED DESCRIPTION

Figure 1:
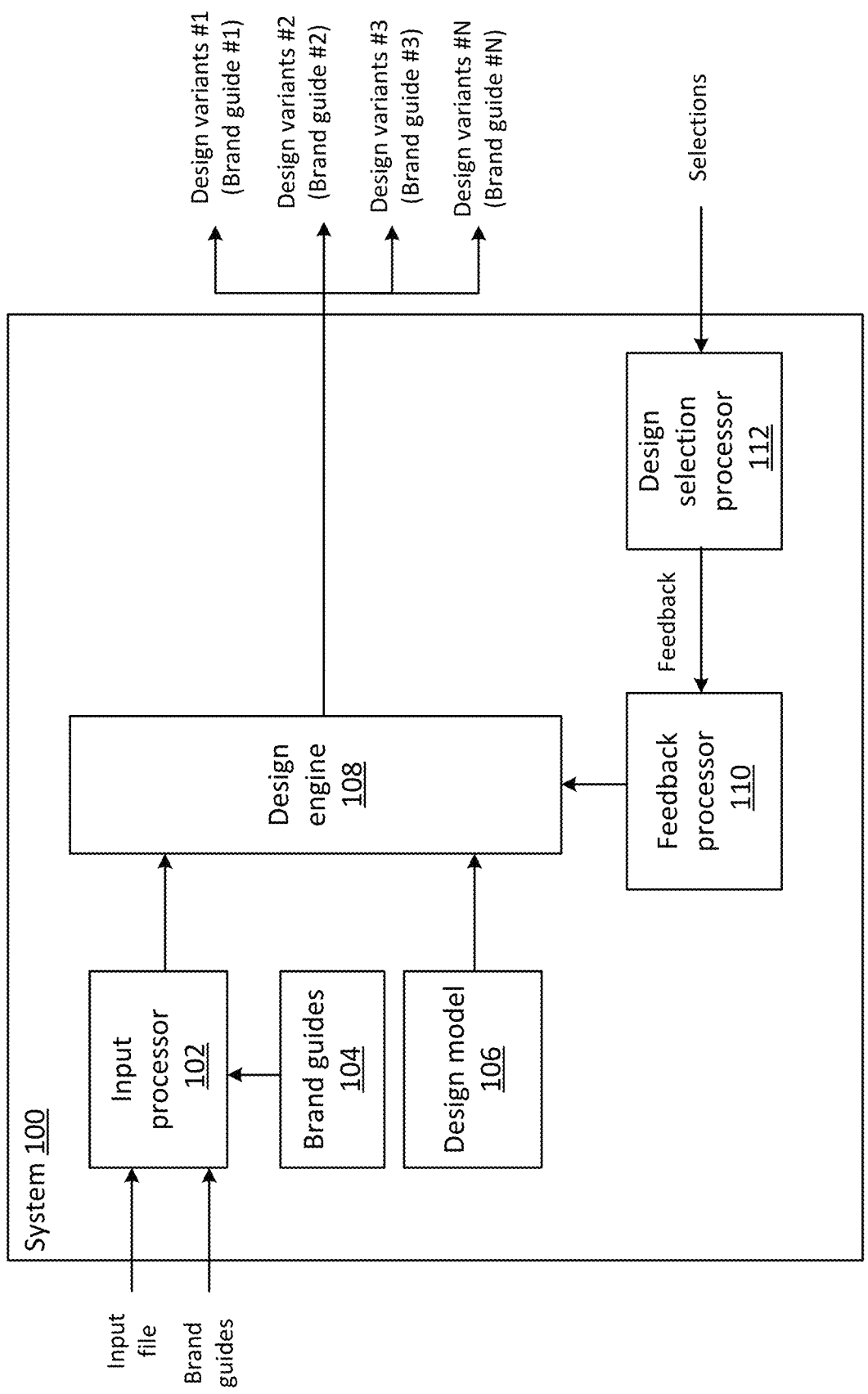
FIG. 1 depicts a simplified system for generating content according to some embodiments.

A system generates design variants using different characteristics, such as different regional characteristics, using batch processing. An example of regions may be different geographical regions. In some examples, a team may want to create content for various regions in the world, such as for countries in North America, Asia, and Europe. These regions may have different characteristics that may require the content to be formatted per region-specific characteristics. For example, guidelines may be followed, such as some regions may have different languages, some regions may have different fonts that are preferred, content may be read left-to-right or right-to-left, and so on.

The system may receive an input file that includes content for different regions. Examples of content may include an image, text items, and other content. Also, the system may receive a selection of brand guides. The brand guides may include information that is used to generate regional designs based on guidelines associated with the region. Brand guides may specify guidelines for different characteristics, such as color palette; fonts and typography hierarchy; alignment; padding and spacing; button styles for call-to-action treatment, such as colors, font, font size, button size, padding, shape, and corner radius; and region-specific requirements, such as left-to-right and right-to-left reading direction, alignment, etc.

The system uses the input file and brand guides to create design variants for each region that is defined in the input file. After generating the design variants for each region, the design variants can be reviewed, and feedback may be received. For example, a user may review the design variants on a user interface and rate the design variants, such as receiving feedback that design variants are not desirable or desirable, highly rated, lowly rated, etc. Also, the system may receive a selection of which design variant in each region to use to create the final asset. For example, the final asset may be materials that can be used on a website. The system then may use the feedback to improve the design variant generation in subsequent content generation requests.

The system improves the generation of design variants. For example, use of the input file and brand guides allow the generation of design variants in a faster manner. The batch processing may process portions of the region-specific design variants in parallel. For example, the design variants may include different variations of an image. The system may process all the variations of the image in a batch. Then, the system may process determining where text items can be placed in the image variations in a batch, and then place text items in the image variations. Typically, a user would have had to generate each design variant one at a time. Additionally, the process of generating one design variant at a time had to be performed for each region. In some cases, this involved so much manual work that a user may only create one design for each region. For example, the user may have had to create the content for each region individually, which requires repeating steps multiple times. In some examples, the user may have had to place one image for the United States to create content for the United States. Then, the user would have to generate a variation of the image for the United States. This process continues based on all the different variations that are desired. Then, the user would have had to place the image (or another image variation) again to create the content for Japan. However, it is possible that the content in Japanese may require the image to be changed slightly, such as because of the way the Japanese characters for text will be formatted. The user would then have to spend time cropping the image differently. This is a time-consuming process. However, the use of batch processing to generate design variants improves the speed in which a computing device can generate the design variants. For example, an image and image variations may be generated for multiple design variants at once at in a batch instead of creating each design variant manually and serially.

Additionally, the system may improve the content that is created. Different regions may have different guidelines that should be followed when creating designs. Typically, understanding all these guidelines may be difficult for a user to follow or understand. However, the system uses brand guides to characterize the guidelines to use for specific regions. This removes the need to understand each region's specific guidelines. The brand guides also standardize the use of the guidelines, which improves the content that is created because content is not created using some guidelines that should not be used for a region. Using the system described herein, the system may automatically generate the design variant based on the guidelines in the brand guides. This process may automatically adjust the content, such as the image, based on the guidelines for a respective region.

Accordingly, the system may use an automated process to generate multiple design variants for each region by analyzing characteristics of the input content and guidelines. The creation of design variants provides the user with multiple options in which to select for the final content material. The use of design variants, brand guides, and batch processing improves the generation of the content and improves the speed in which the system can generate the content.

System Overview

FIG. 1 depicts a simplified system 100 for generating content according to some embodiments. System 100 includes a design engine 108 that receives input and generates design variants. In the generation process, an input processor 102 may receive an input file. For example, the input file may include data that is formatted in a specified format, such as comma separated values (csv) format. In some examples, the input file may be organized by regions. In some embodiments, the region may be associated with a location, such as Asia, North America, Europe, or specific countries in the regions. However, other characteristics may be used, such as company departments, or any other type of classification. In some examples, a user may be on a team that wants to generate region-specific content, such as emails, websites, advertisements, and global applications, etc. The user may want to generate the content based on different guidelines of different regions.

The user may generate an input file that may include content to be used, such as an image and text items. The image and text items may be used for the dynamic generation of content, such as, marketing content. For example, the image may depict a product that will be marketed with the marketing content. The image may, for example, depict people using or interacting with the product, the product on its own, multiple products, or imagery that may be associated with a product. The image may also depict an object or objects that are not directly or indirectly related to any product that may be marketed with generated content.

The text may be items of text that may be related to the image or other content being generated in any suitable manner. For example, if the content being generated is for marketing a product, the text items may relate to the product, and to the marketing of the product, including, for example, a text item that describes the product, a text item that is a slogan or sales pitch for the product, and a text item that may inform a viewer of the content how he/she can obtain the product, including, for example, text items for buttons or other interactive elements of the content, which may be part of a webpage or content viewed in a standalone application, that a viewer may use such as "view now", "add to cart", or "purchase now." The received text items may have been generated in any suitable manner. For example, the received text items may have been written by a user, for example, a copywriter, or may have been generated using any suitable natural language processing (NLP) or natural language generation (NLG) model, such as a text style transfer model, that may have been trained on text items for content. For example, if the content is being created for a brand, the text items may be generated using an NLP or NLG model trained on previous copy written for the brand, resulting in the generated text items being written in the style of the brand.

In addition to the input file, input processor 102 may receive a selection of brand guides 104. For example, input processor 102 may receive an input that selects a brand guide 104 for each region. In other embodiments, input processor 102 may select brand guides 104 automatically, such as based on the region that is specified in the input file. Design engine 108 uses brand guides 104 to generate content per region based on guidelines found in the respective brand guides 104. Brand guides 104 may include any suitable data for a brand, including, for example, data on patterns used by for the brand in content, such as how text is positioned, aligned, and shaped, specific aspects of the brand's style used for text in different positions, and positioning of elements of content including iconography and user interface elements such as buttons. For example, the brand guide for a region may indicate how the brand generally positions related text and user interface buttons relative to each other in their marketing content. Brand guides 104 may be gathered in any suitable manner, including, for example, being input directly, or being collected through extraction from already existing content for the entity, for example, crawling webpages for a brand. For example, a brand guide 104 may specify the font to use and also whether the content should be read left-to-right or right-to-left. In some examples, if the user wants to generate content in the United States and Japan, the user may select a North American brand guide that includes guidelines for the United States and a brand guide for Japan.

Design engine 108 may also use a design model 106 to generate design variants. Design model 106 may include information is used to create design variants in different regions automatically. For example, design model 106 may include translations of common phrases and previous translations from content that was generated previously. Also, design model 106 may include machine-learning models, such as neural machine translation (NMT) that have been trained on domain-specific data, such as eCommerce domains, real estate, clothing, etc. Design model 106 may be used to generate translations and understand other language-specific adjustments, such as some languages may be more verbose, some languages cannot have breaks, some languages have specific spacing, etc. Also, some languages have words that cannot be hyphenated to fit within the width of the content. Examples of design model 106 will be described below.

Design engine 108 may process the input file and brand guides 104 using design model 106 to generate design variants for each region. For example, design engine 108 generates design variants #1 for a brand guide #1, design variants #2 for a brand guide #2, design variants #3 for a brand guide #3, . . . , and design variants #N for a brand guide #N. For each brand guide 104 and region-specific entry, multiple variations on the design may be generated. For example, within design variants #1, 20 variations on the generated design are included. Design variants #2 may also include 20 variants, but other amounts of variants may be included. In some embodiments, for one set of design variants, different aspects of the content may be altered. For example, a first design variant may include the full image and text overlaid on top of the image. A second design variant may include a cropped image and the text included on a side panel. Various examples of design variants may be appreciated and will be described in more detail below.

Design engine 108 may output the design variants, such as on a user interface. Then, the design variants may be reviewed. For example, a user may review the design variants and provide feedback. The feedback may include different information, such as a selection from the user may be received selecting one of the design variants for each region. Also, feedback may be received that rates the design variants. For example, a first rating may be received for a first design variant that indicates the design variant is not rated highly, such as it is off-brand (e.g., does not represent the brand) or it is a design pattern that is not desirable. Also, a rating may be received that rates a design variant highly, such as the design variant is on-brand (e.g., represents the brand) or a design pattern that the user might want to see in the future.

A design selection processor 112 receives the selections from the user. Then, feedback from the selections may be processed by a feedback processor 110, which may adjust logic in design engine 108 based on the feedback. For example, machine learning may be used to adjust parameters in design engine 108 that are used to generate design variants. In some examples, if a design variant is rated with a low score, then the feedback processor 110 may cause logic in design engine 108 to not select that design variant for future use or alter the design variant in some way based on the feedback.

The following will now describe the input processing, the design variant generation, and the feedback analysis in more detail.

Input Processing

Figure 2:
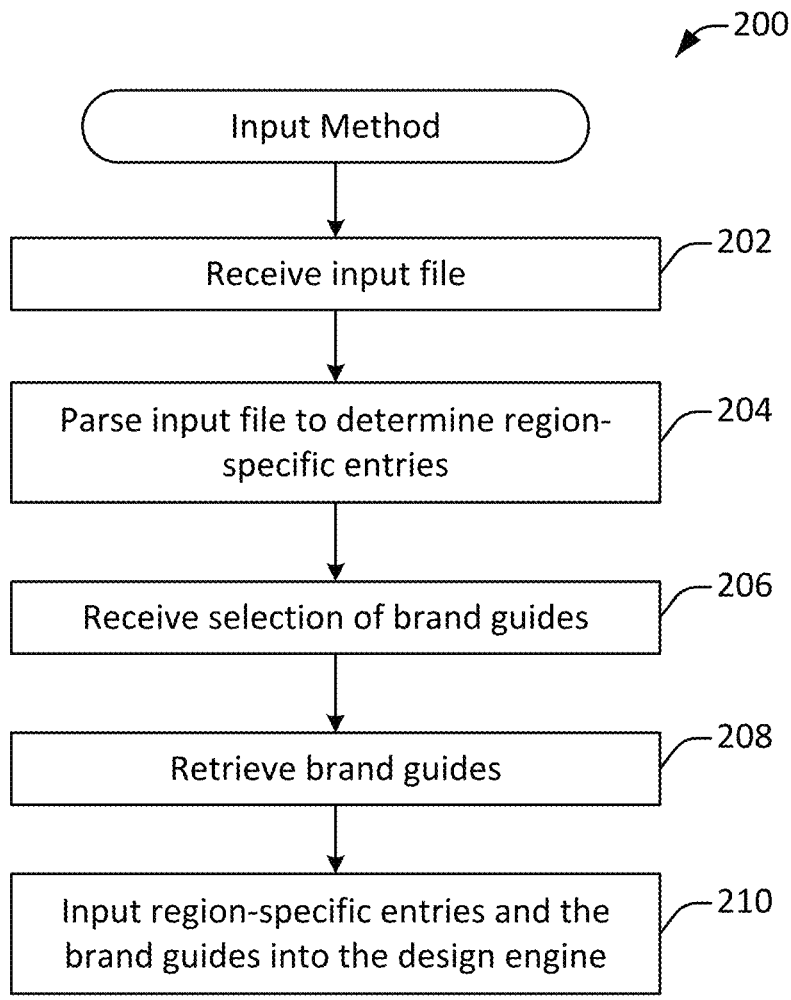
FIG. 2 depicts a simplified flowchart of a method for processing the input file according to some embodiments.

FIG. 2 depicts a simplified flowchart 200 of a method for processing the input file according to some embodiments. At 202, input processor 102 receives an input file. For example, a user may create the input file and upload the input file to design engine 108. At 204, input processor 102 parses the input file to determine region-specific entries. FIG. 3 depicts an example of an input file 300 according to some embodiments. Input file 300 includes entries 302-1, 302-2, 302-3, 302-4, and 302-5. Although five entries are disclosed, input file 300 may include different numbers of entries. In some embodiments, each entry 302 may be associated with a different characteristic, such as a region. For example, the specific regions may include the United States, United Kingdom, Germany, France, and Japan in entries 302-1 to 302-5, respectively. Also, each entry may include information for the region. For example, columns 304 to 312 may include information for a region code, image, headline, body, and call to action (CTA), respectively. The region code may be an identifier for the region, such as a code "DE" is for Germany and a "EN-US" is for the United States English region. An image may be visual information to display in design variants and is included in the design in column 306. Columns 308, 310, and 312 may include items of text information. In this example, the text items may be broken out into a headline, a body, and call to action, but other text categories may be used. The headline, body, and call to action may include textual information, but may be other types of information, such as images. The headline may be the headline that is shown; the body may be the body of text that is included; and the call to action may be the action that is desired. The text may be provided in different languages per the region. For example, for the United States and United Kingdom, the text is in English; for Germany, the text is in German; in Japan, the text in Japanese, and so on.

While information may be repeated in each region. Duplicate information may be included once for one region and input processor 102 may automatically duplicate the information to other regions. For example, an image may be associated with one or more regions. In some examples, the same image may be associated with the United States, the United Kingdom, and Germany regions while different images may be associated with the France and Japan regions. In this case, the same image may not have to be included in entries 302-1, 302-2, and 302-3. Rather, a specification that a single image may be used in the three regions may be included in input file 300. Similar specifications may be used for any other content that is included in an entry, such as the body or call to action, that can be used in multiple entries.

Referring back to FIG. 2, input processor 102 receives a selection of brand guides 104. Brand guides 104 may be selected based on the associated regions in input file 300. For example, a selection from a user may be received that may associate a brand guide 104 with a region specified in input file 300. In some examples, a selection from a user may associate the United States brand guide with the entry at 302-1 for the United States region. A region may also have multiple brand guides 104, such as the United States may have brand guides for the western part, southern part, etc. In this case, a selection of which brand guide for the United States may be received. In other examples, design engine 108 may automatically select the brand guides 104 based on the region that is specified in input file 300. For example, for each region code, design engine 108 selects an associated brand guide 104. In some examples, for the United States region, design engine 108 selects a United States brand guide; for the United Kingdom region, design engine 108 selects a United Kingdom brand guide, etc. In some embodiments, multiple regions may have the same associated brand guide 104, such as the United States and the United Kingdom may have the same brand guide 104.

At 208, input processor 102 retrieves brand guides 104 from storage. Brand guides 104 may have been pre-defined and thus, the user does not need to regenerate brand guides 104 when creating multiple designs. At 210, input processor 102 inputs brand guides 104 and region-specific entries from input file 300 into design engine 108. Design engine 108 can then generate design variants.

Design Generation

Figure 4:
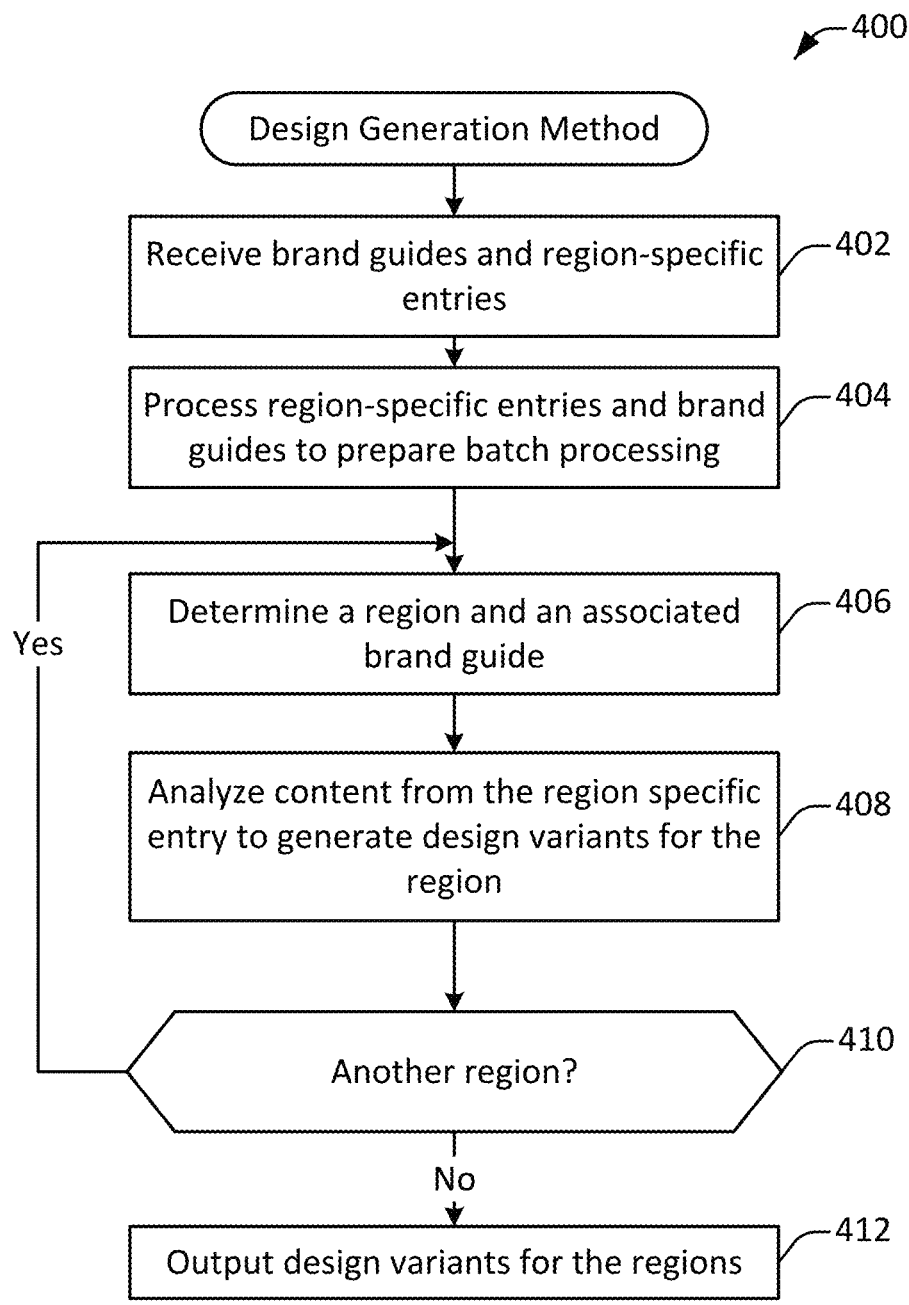
FIG. 4 depicts a simplified flowchart of a method for generating design variants according to some embodiments.

FIG. 4 depicts a simplified flowchart 400 of a method for generating design variants according to some embodiments. At 402, design engine 108 receives brand guides 104 and region-specific entries from the input file. At 404, design engine 108 processes region-specific entries and brand guides 104 to prepare for batch processing. For example, design engine 108 may determine information in region-specific entries that may be used across multiple design variants. The content may be used for multiple design variants within a specific region or across different regions. For example, the same image may be associated with multiple design variants within a region. Also, the same image may be used in multiple regions, such as the United States and the United Kingdom regions. Design engine 108 may determine which content may be used across multiple design variants in different ways. In some embodiments, an image and text items for one region may be reused in the batch processing. Also, the input file may have specified which information may be used across design variants, such as across multiple regions. For example, a tag is inserted in the input file indicating that an image may be used across regions.

The following process may be performed for each region. Design engine 108 may generate design variants for different regions in parallel or serially. At 406, design engine 108 determines a region and the associated brand guide 104. For example, the region may be the United States and the United States brand guide 104 may be determined. At 408, design engine 108 analyzes content from the region-specific entry to generate design variants for the region. In some examples, the same image is input into design engine 108, and design engine 108 outputs design variants in a single region with variations in the image. In a batch, design engine 108 generates the image variants for placement in design variants at once. Then, design engine 108 may analyze the image variations to place text items in different areas of the image variations. The process may use batch processing, which performs the processing of an item for all design variants at once. For example, design engine 108 generates all image variations, and then places text items in the image variations. The use of batch processing improves the speed of generating design variants because the image is processed once instead of generating design variants serially. For example, design engine 108 does not generate a first design variant by generating an image variation and placing text items, and then generate a second design variant by going back and generating another image variation and placing text. In this case, design engine 108 retrieves the image each time when a new design variant is being processed. In contrast, in batch processing, design engine 108 retrieves the image once to create the design variations. This process is described in more detail in FIG. 6.

At 410, design engine 108 determines if another region should be processed. If another region needs to be processed, design engine 108 processes the region as described above in 406 and 408. If no other regions need to be processed, at 412, design engine 108 outputs design variants for the region. As described above, design engine 108 may be processing regions in parallel and the flow of generating design variants in a region and in different regions may be performed in parallel, and not be performed serially.

Figure 5:
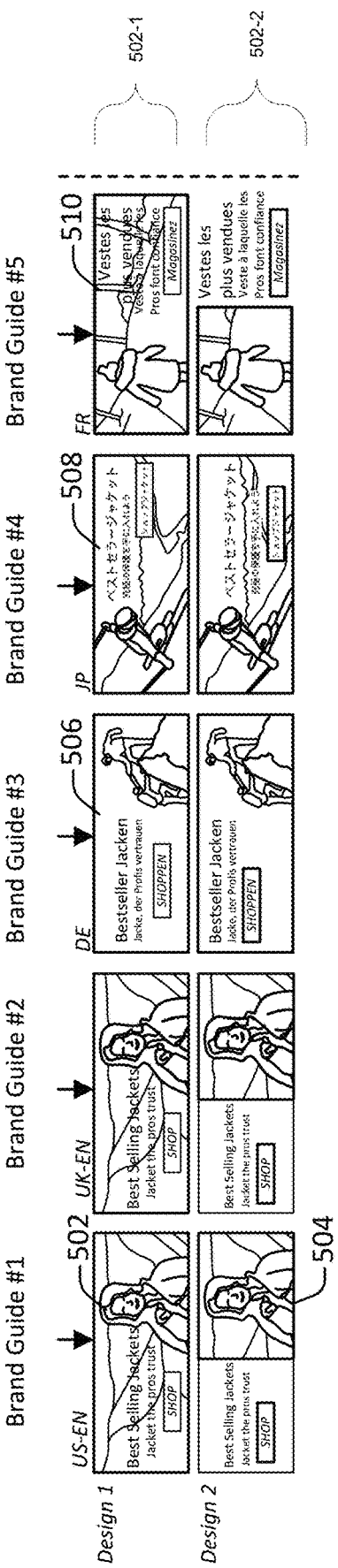
FIG. 5 depicts an example of design variants according to some embodiments.

FIG. 5 depicts an example of design variants according to some embodiments. A first row of design variants is shown at 500-1 and a second row of design variants is shown at 500-2. Additional design variants may also be appreciated. As shown, different brand guides may be used to generate different design variants for different regions. For example, a brand guide #1 is used to generate design variants for the United States region; brand guide #2 is used to generate design variants for the United Kingdom region; brand guide #3 is used to generate design variants for the German region, etc.

Design variants may include a different variation from another design variant. For example, in the United States region, a first design variant at 502 includes a full version of the image. Then, a second design variant at 504 includes a cropped version of the image. Also, the text items in the design variant at 502 may be overlaid over the image and the text items for the design variant at 504 may be included in a panel that does not overlay over the image. Also, the design variants for other regions may include variations that may be the same or different from other regions. For example, a third design variant at 506, a fourth design variant at 508, and a fifth design variant at 510 include different images.

Figure 6:
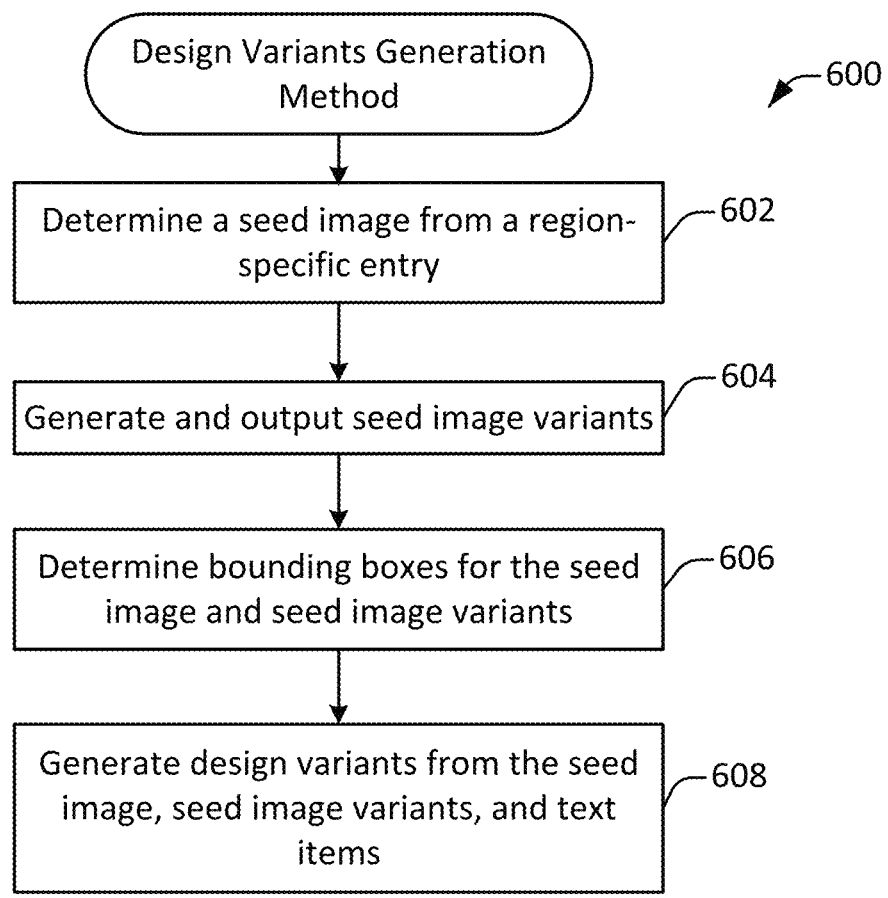
FIG. 6 depicts a simplified flowchart of a method for generating design variants according to some embodiments.

Design engine 108 may generate design variants with different variations automatically. FIG. 6 depicts a simplified flowchart 600 of a method for generating design variants according to some embodiments. At 602, design engine 108 determines a seed image from a region-specific entry. At 604, design engine 108 may use the seed image to generate additional images, such as seed image variants, by varying some characteristic of the seed image. For example, based on a position of an object in the image, design engine 108 creates different design variants, such as by cropping the image in different ways while not cropping out the object. In some embodiments, design engine 108 may generate seed image variants using an asset generation model. The asset generation model may be any suitable model that may have been trained to generate variations of an image, such as to generate cropped versions of an input image without cropping out objects of interest in the input image. The asset generation model may be, for example, a generative adversarial network (GAN) with a generator network trained to generate cropped version of an input image and a discriminator network trained to identify badly cropped images, which may be cropped images that have removed objects of interest from the input image. A generative adversarial network for an asset generation model may use as input, for example, a seed image and a random number. A seed image that depicts a product may be input to the asset generation model that may output any suitable number of seed image variants that are cropped versions of the seed image that still depict the product. For example, a seed image may be input to the generative adversarial network for an asset generation model multiple times, with multiple different random numbers, generating a candidate seed image variant for each random number used. Then, candidate seed image variants that are passed as acceptable by the discriminator network of the generative adversarial network may be output as seed image variants.

Also, design engine 108 may determine variations for placing text in the seed image variants. Design engine 108 may use different methods. In some examples, bounding boxes that can be used to insert text may be identified. Accordingly, at 606, design engine 108 determines bounding boxes for the seed image and seed image variants. The bounding boxes may be any types of shapes and are not limited to a square or rectangle. Design engine 108 may use a copyspace model that may generate sets of bounding boxes for an image. The copyspace model may, for example, be any suitable machine learning model for detecting areas of an image that may be used for the placement of text items. For example, the copyspace model may be an object detection model that may detect objects in the seed image and may generate bounding boxes that bound areas where objects were not detected. The copyspace model may also be, for example, a generative adversarial network that may include a generator network trained to generate bounding boxes around areas of an image that do not include an object and a discriminator network trained to detect bounding boxes that have been generated to include areas of an image that include an object that should not be covered with a text item. The copyspace model may output a single set or multiple sets of bounding boxes for any image input to the copyspace model. If seed image variants have been generated, the seed image variants may also be input to the copyspace model, which may generate sets of bounding boxes for each of the seed image variants.

At 608, design engine 108 generates variant designs from the seed image, seed image variants, and text items. Design engine 108 may use design model 106 to perform adjustments to text in the design variants, such as adjusting bounding boxes, placing text items in bounding boxes, and applying style data to the text items to generate design variants. Design model 106 may, for example, be any suitable machine learning model that may be trained to generate design variants from a seed image, bounding boxes, and text items. For example, design model 106 may be a generative adversarial network, or may be a heuristic model. A heuristic model that is used to implement design model 106 may be based on statistics gathered from examples of content from various entities. For example, the heuristic model may use statistics gathered from analysis of marketing content from any number of brands. The statistics gathered from analysis of marketing content may include, for example, absolute and relative locations at which text items are placed within the marketing content. Design model 106 then uses the locations to place the text in the bounding boxes. The generative adversarial network may include a discriminator network that has been trained using content from entities, such as marketing content from various brands, to identify images that can serve as viable content for the entity, and a generator network trained to output content, such as design variants, based on input images, bounding boxes, and text items. The generative adversarial network may also use random number inputs to the generator network in addition to other inputs to allow for variance in the design variants generated by the generator network. Only design variants output by the generator network of the generative adversarial network that the discriminator network of the generative adversarial network evaluates as being viable content for the entity, such as a viable example of marketing content for a brand, may be output from the generative adversarial network.

In some examples, design engine 108 may use design model 106 to adjust the bounding boxes generated for an image, such as a seed image or seed image variants, to generate additional sets of bounding boxes for the image. For example, design model 106 may adjust each set of bounding boxes generated for the seed image by adjusting the sizes of the bounding boxes through moving their boundaries to the horizontal or vertical edges of the seed image, or snapping the edges to a gridline indicating a significant division of the seed image, such as, for example, horizontal or vertical lines at halves, thirds, or quarters of the seed image. Design model 106 may also add bounding boxes to existing sets of bounding boxes, for example, to cover an area between the boundary of a bounding box and a horizontal or vertical edge of the seed image or horizontal or vertical gridline at a significant division of the image. This may also generate additional sets of bounding boxes for the seed images.

Design engine 108 may generate design variants by placing text items into the bounding boxes based on a brand guide 104. The seed image and any seed image variants may each have any number of sets of bounding boxes generated by the copyspace model and design model.

Design engine 108 may use brand guide 104 to determine how to place the text items into and arrange the text items within the bounding boxes of a set of bounding boxes for the seed image or a seed image variant. Design engine 108 may generate any number of different placements and arrangements of the text items within a set of bounding boxes for a seed image or seed image variant. Design engine 108 may use brand guide 104 to change the typography of the text items that have been placed in bounding boxes, including, for example, the font faces, font sizes, font colors, letter and word spacing, and any other suitable aspects of the text items, and to add iconography from the entity style data to the bounding boxes. Design engine 108 may generate any number of different applications of information from brand guide 104 to the different arrangement and placements of the text items within the sets of bounding boxes for the seed image and seed image variants, generating design variants. Thus, any number of design variants may be generated from a seed image or seed image variant. The design variants generated from the same seed image or seed image variant may vary by having different sets of bounding boxes, different arrangements and placements of text items within the bounding boxes, and/or different applications of the information from brand guide 104 to the text items. For example, two design variants generated from the seed image may use the same set of bounding boxes, but have different arrangement and placement of text items within those bounding boxes and/or a different application of the fonts to the text items, while other design variants may have differing sets of bounding boxes. Also, the brand guide for one region may have text that reads left to right, and for another region, have text that reads right to left.

Feedback

Figure 7:
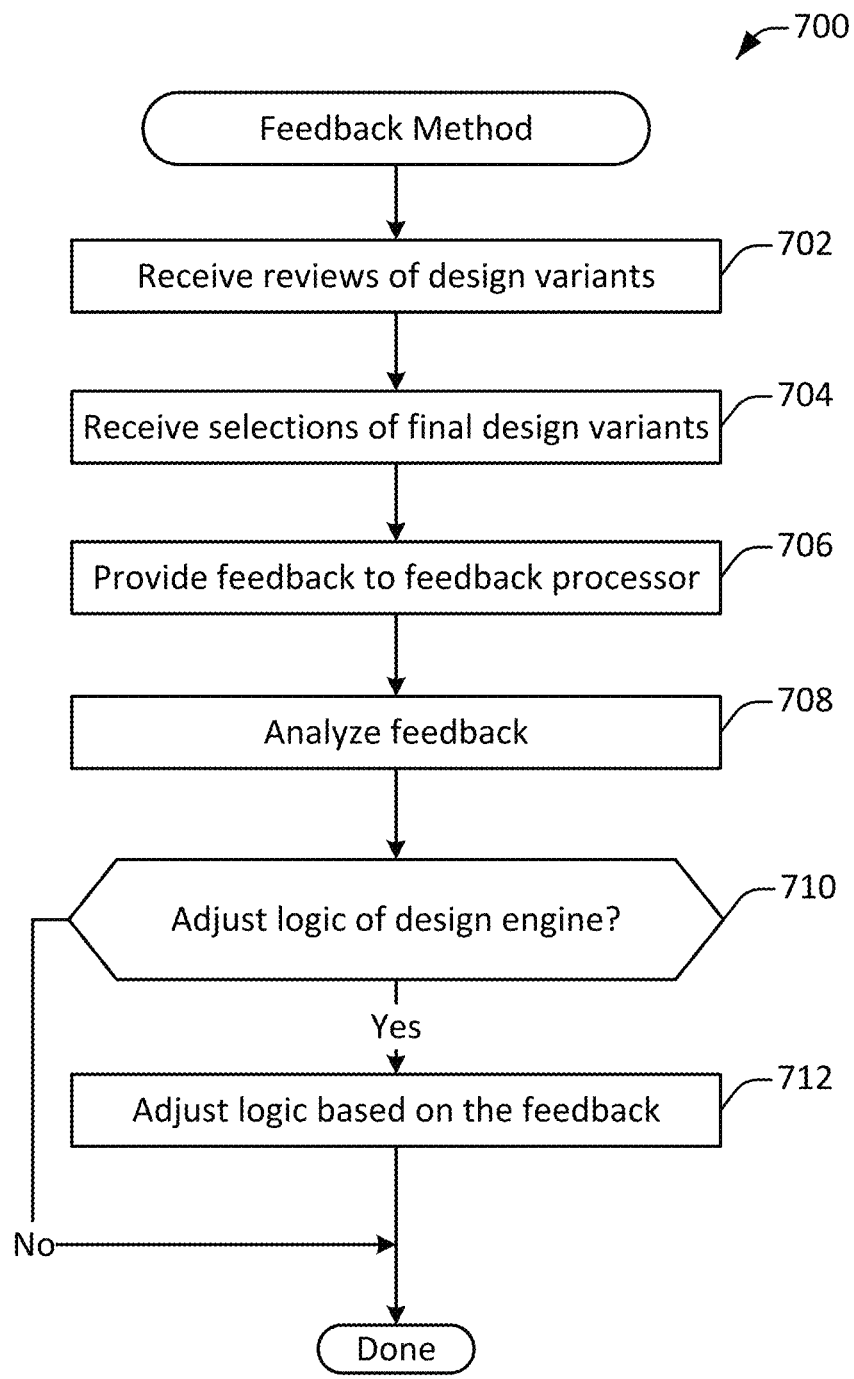
FIG. 7 depicts a simplified flowchart of a method for processing feedback according to some embodiments.

After generating the design variants, design engine 108 may output the design variants on a user interface for review by a user. FIG. 7 depicts a simplified flowchart 700 of a method for processing feedback according to some embodiments. At 702, design selection processor 112 receives reviews of design variants from the user interface. The reviews may be ratings of different design variants including indicating which design variants may be desirable or undesirable, or ratings of preferences. For example, a user may rate design variants from a range of 0 to 10 with 0 being undesirable and 10 being the most desirable. Also, a user may indicate that a design variant is not on-brand and should not be used again or a design variant is on-brand and should be used again.

At 704, design selection processor 112 receives the selections of final design variants. For example, a selection for each region may be received that indicates a design variant or variants that should be used in the final output for each region.

At 706, design selection processor 112 may provide feedback to feedback processor 110. The feedback may indicate which design variants were selected, design variants that were rated below a threshold, design variants that were rated above a threshold, etc. The feedback may be included in different formats.

At 708, feedback processor 110 analyzes the feedback. The analysis may determine if logic should be adjusted in design engine 108. For example, if some design variants have low ratings, feedback processor 110 may determine that logic should be adjusted to remove these design variants or to adjust these design variants. At 710, feedback processor 110 determines whether to adjust the logic of design engine 108. If the logic should not be changed, then the process may finish. At 712, if the logic should be adjusted, feedback processor 110 may adjust the logic based on the feedback. For example, some possible design variants may be removed or some possible design variants may be adjusted. Also, instead of cropping an image, the logic may be changed to not crop the image. For example, the feedback may indicate that the cropped image removed too much of the image. Also, bounding boxes may be changed to move the text to different areas in the image based on the feedback. For example, the feedback may indicate that the text was hard to read.

Accordingly, a user may submit an input file and have the design variants for multiple regions automatically created. This may save multiple resources and time for the user because the user does not need to individually generate designs for multiple regions. The single input file may be used to generate design variants for multiple regions. Design engine 108 may also leverage techniques to improve the generation of design variants, such as batch processing, which improves the speed at which design variants are generated. Using brand guides also standardizes the characteristics of designs in a region, which frees the user from determining the characteristics in addition to providing standardized characteristics for multiple designs in a region. Further, the feedback may be used to improve the quality of design variants that are output.

Figure 8:
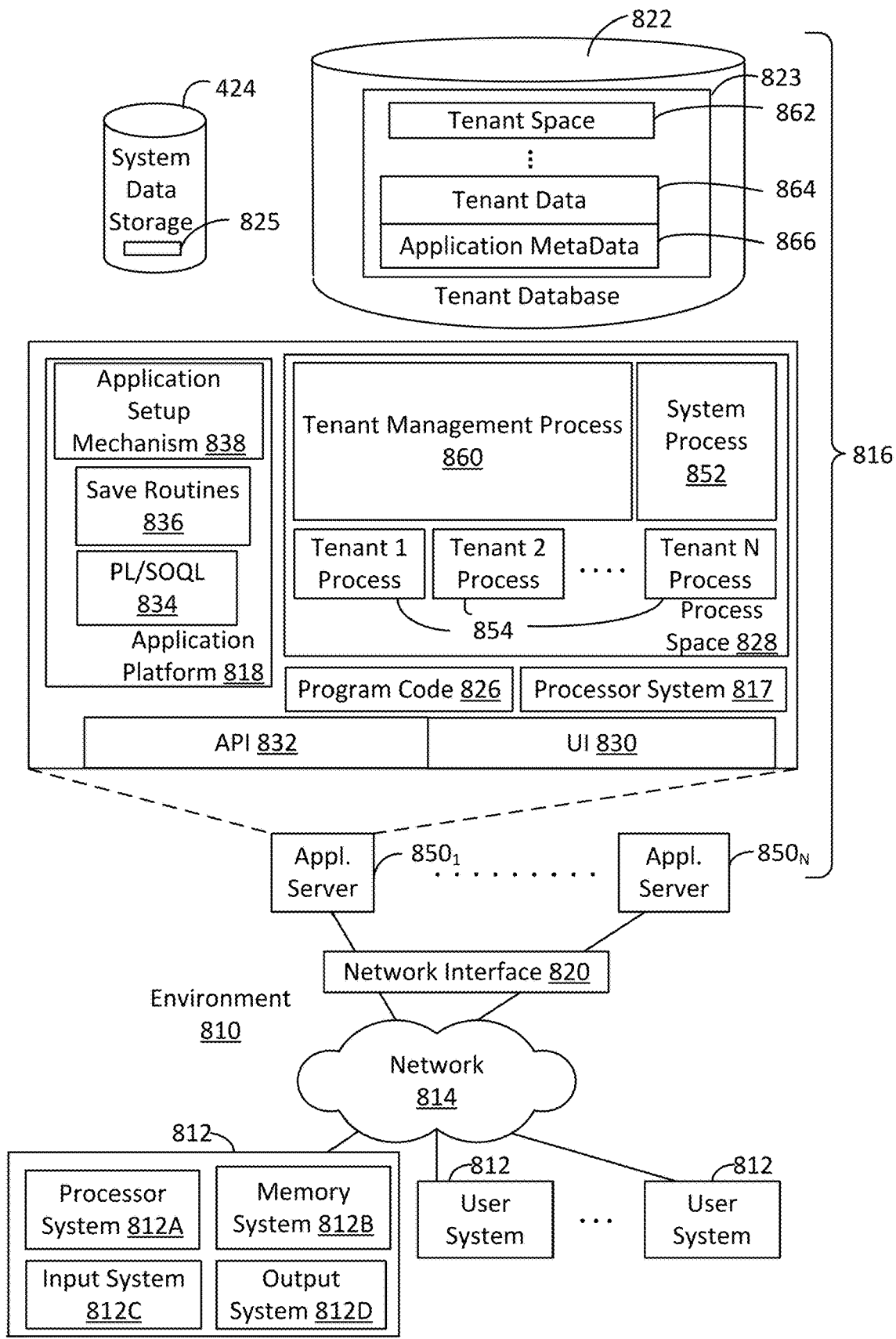
FIG. 8 shows a block diagram of an example of an environment that includes an on-demand database service configured in accordance with some implementations.

FIG. 8 shows a block diagram of an example of an environment 810 that includes an on-demand database service configured in accordance with some implementations. Environment 810 may include user systems 812, network 814, database system 816, processor system 817, application platform 818, network interface 820, tenant data storage 822, tenant data 823, system data storage 824, system data 825, program code 826, process space 828, User Interface (UI) 830, Application Program Interface (API) 832, PL/SOQL 834, save routines 836, application setup mechanism 838, application servers 850-1 through 850-N, system process space 852, tenant process spaces 854, tenant management process space 860, tenant storage space 862, user storage 864, and application metadata 866. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 816, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 818 may be a framework that allows the creation, management, and execution of applications in system 816. Such applications may be developed by the database service provider or by users or third-party application developers accessing the service. Application platform 818 includes an application setup mechanism 838 that supports application developers' creation and management of applications, which may be saved as metadata into tenant data storage 822 by save routines 836 for execution by subscribers as one or more tenant process spaces 854 managed by tenant management process 860 for example. Invocations to such applications may be coded using PL/SOQL 834 that provides a programming language style interface extension to API 832. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 866 for a subscriber making such an invocation. Such system processes may also manage execution of application metadata 866 as an application in a virtual machine.

In some implementations, each application server 850 may handle requests for any user associated with any organization. A load balancing function (e.g., an F5 Big-IP load balancer) may distribute requests to the application servers 850 based on an algorithm such as least-connections, round robin, observed response time, etc. Each application server 850 may be configured to communicate with tenant data storage 822 and the tenant data 823 therein, and system data storage 824 and the system data 825 therein to serve requests of user systems 812. The tenant data 823 may be divided into individual tenant storage spaces 862, which can be either a physical arrangement and/or a logical arrangement of data. Within each tenant storage space 862, user storage 864 and application metadata 866 may be similarly allocated for each user. For example, a copy of a user's most recently used (MRU) items might be stored to user storage 864. Similarly, a copy of MRU items for an entire tenant organization may be stored to tenant storage space 862. A UI 830 provides a user interface and an API 832 provides an application programming interface to system 816 resident processes to users and/or developers at user systems 812.

System 816 may implement a web-based content generation system. For example, in some implementations, system 816 may include application servers configured to implement and execute content generation software applications. The application servers may be configured to provide related data, code, forms, web pages and other information to and from user systems 812. Additionally, the application servers may be configured to store information to, and retrieve information from a database system. Such information may include related data, objects, and/or Webpage content. With a multi-tenant system, data for multiple tenants may be stored in the same physical database object in tenant data storage 822, however, tenant data may be arranged in the storage medium(s) of tenant data storage 822 so that data of one tenant is kept logically separate from that of other tenants. In such a scheme, one tenant may not access another tenant's data, unless such data is expressly shared.

Several elements in the system shown in FIG. 8 include conventional, well-known elements that are explained only briefly here. For example, user system 812 may include processor system 812A, memory system 812B, input system 812C, and output system 812D. A user system 812 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 812 to access, process and view information, pages and applications available from system 816 over network 814. Network 814 may be any network or combination of networks of devices that communicate with one another, such as any one or any combination of a LAN (local area network), WAN (wide area network), wireless network, or other appropriate configuration.

The users of user systems 812 may differ in their respective capacities, and the capacity of a particular user system 812 to access information may be determined at least in part by "permissions" of the particular user system 812. As discussed herein, permissions generally govern access to computing resources such as data objects, components, and other entities of a computing system, such as a content generation system, a social networking system, and/or a CRM database system. "Permission sets" generally refer to groups of permissions that may be assigned to users of such a computing environment. For instance, the assignments of users and permission sets may be stored in one or more databases of System 816. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 816 may provide on-demand database service to user systems 812 using an MTS arrangement. By way of example, one tenant organization may be a company that employs a sales force where each salesperson uses system 816 to manage their sales process. Thus, a user in such an organization may maintain contact data, leads data, customer follow-up data, performance data, goals and progress data, etc., all applicable to that user's personal sales process (e.g., in tenant data storage 822). In this arrangement, a user may manage his or her sales efforts and cycles from a variety of devices, since relevant data and applications to interact with (e.g., access, view, modify, report, transmit, calculate, etc.) such data may be maintained and accessed by any user system 812 having network access.

When implemented in an MTS arrangement, system 816 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 816 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 816 may also maintain system-level data usable by multiple tenants or other data. Such system-level data may include industry reports, news, postings, and the like that are sharable between tenant organizations.

In some implementations, user systems 812 may be client systems communicating with application servers 850 to request and update system-level and tenant-level data from system 816. By way of example, user systems 812 may send one or more queries requesting data of a database maintained in tenant data storage 822 and/or system data storage 824. An application server 850 of system 816 may automatically generate one or more SQL statements (e.g., one or more SQL queries) that are designed to access the requested data. System data storage 824 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI- TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 9A:
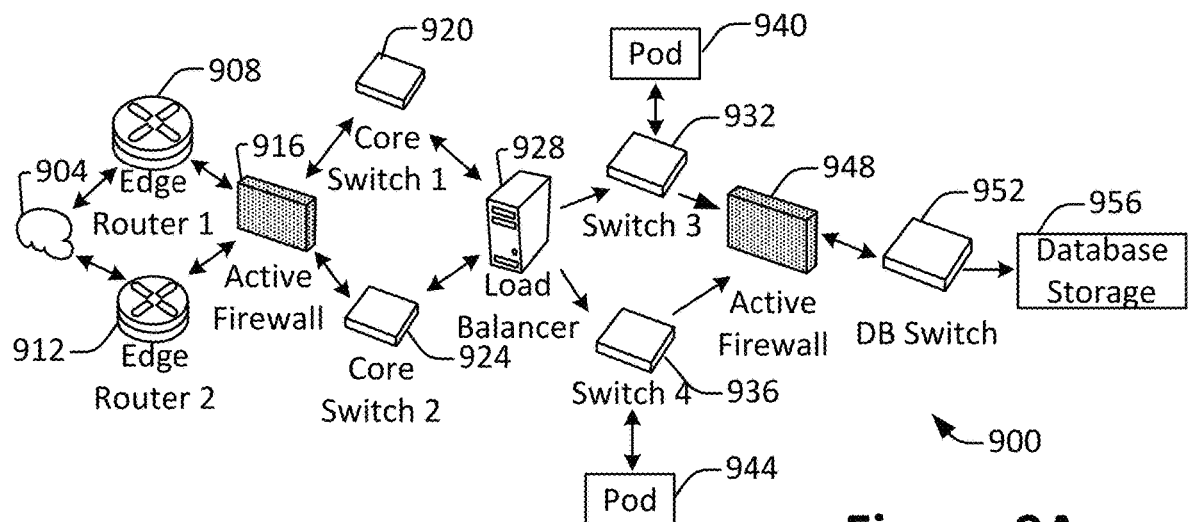
FIG. 9A shows a system diagram of an example of architectural components of an on-demand database service environment, configured in accordance with some implementations.

FIG. 9A shows a system diagram of an example of architectural components of an on-demand database service environment 900, configured in accordance with some implementations. A client machine located in the cloud 904 may communicate with the on-demand database service environment via one or more edge routers 908 and 912. A client machine may include any of the examples of user systems 812 described above. The edge routers 908 and 912 may communicate with one or more core switches 920 and 924 via firewall 916. The core switches may communicate with a load balancer 928, which may distribute server load over different pods, such as the pods 940 and 944 by communication via pod switches 932 and 936. The pods 940 and 944, which may each include one or more servers and/or other computing resources, may perform data processing and other operations used to provide on-demand services. Components of the environment may communicate with a database storage 956 via a database firewall 948 and a database switch 952.

Accessing an on-demand database service environment may involve communications transmitted among a variety of different components. The environment 900 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 9A and 9B.

The cloud 904 refers to any suitable data network or combination of data networks, which may include the Internet. Client machines located in the cloud 904 may communicate with the on-demand database service environment 900 to access services provided by the on-demand database service environment 900. By way of example, client machines may access the on-demand database service environment 900 to retrieve, store, edit, and/or process content information.

In some implementations, the edge routers 908 and 912 route packets between the cloud 904 and other components of the on-demand database service environment 900. The edge routers 908 and 912 may employ the Border Gateway Protocol (BGP). The edge routers 908 and 912 may maintain a table of IP networks or 'prefixes', which designate network reachability among autonomous systems on the internet.

In one or more implementations, the firewall 916 may protect the inner components of the environment 900 from internet traffic. The firewall 916 may block, permit, or deny access to the inner components of the on-demand database service environment 900 based upon a set of rules and/or other criteria. The firewall 916 may act as one or more of a packet filter, an application gateway, a stateful filter, a proxy server, or any other type of firewall.

In some implementations, the core switches 920 and 924 may be high-capacity switches that transfer packets within the environment 900. The core switches 920 and 924 may be configured as network bridges that quickly route data between different components within the on-demand database service environment. The use of two or more core switches 920 and 924 may provide redundancy and/or reduced latency.

In some implementations, communication between the pods 940 and 944 may be conducted via the pod switches 932 and 936. The pod switches 932 and 936 may facilitate communication between the pods 940 and 944 and client machines, for example via core switches 920 and 924. Also or alternatively, the pod switches 932 and 936 may facilitate communication between the pods 940 and 944 and the database storage 956. The load balancer 928 may distribute workload between the pods, which may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948, which may act as a computer application firewall operating at the database application layer of a protocol stack. The database firewall 948 may protect the database storage 956 from application attacks such as structure query language (SQL) injection, database rootkits, and unauthorized information disclosure. The database firewall 948 may include a host using one or more forms of reverse proxy services to proxy traffic before passing it to a gateway router and/or may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, the database storage 956 may be an on-demand database system shared by many different organizations. The on-demand database service may employ a single-tenant approach, a multi-tenant approach, a virtualized approach, or any other type of database approach. Communication with the database storage 956 may be conducted via the database switch 952. The database storage 956 may include various software components for handling database queries. Accordingly, the database switch 952 may direct database queries transmitted by other components of the environment (e.g., the pods 940 and 944) to the correct components within the database storage 956.

Figure 9B:
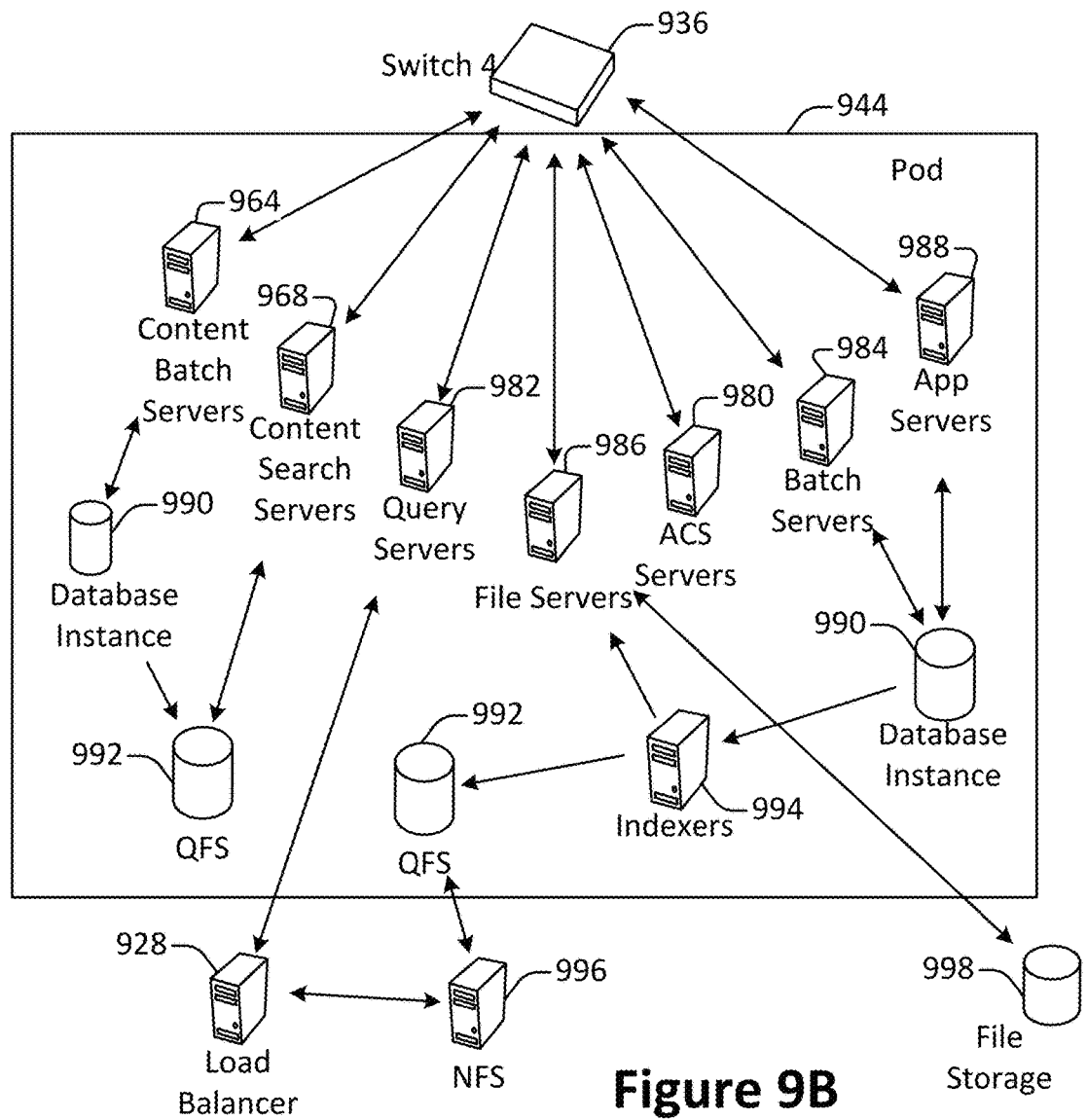
FIG. 9B shows a system diagram further illustrating an example of architectural components of an on-demand database service environment, in accordance with some implementations.

FIG. 9B shows a system diagram further illustrating an example of architectural components of an on-demand database service environment, in accordance with some implementations. The pod 944 may be used to render services to user(s) of the on-demand database service environment 900. The pod 944 may include one or more content batch servers 964, content search servers 968, query servers 982, file servers 986, access control system (ACS) servers 980, batch servers 984, and app servers 988. Also, the pod 944 may include database instances 990, quick file systems (QFS) 992, and indexers 994. Some or all communication between the servers in the pod 944 may be transmitted via the switch 936.

In some implementations, the app servers 988 may include a framework dedicated to the execution of procedures (e.g., programs, routines, scripts) for supporting the construction of applications provided by the on-demand database service environment 900 via the pod 944. One or more instances of the app server 988 may be configured to execute all or a portion of the operations of the services described herein.

In some implementations, as discussed above, the pod 944 may include one or more database instances 990. A database instance 990 may be configured as an MTS in which different organizations share access to the same database, using the techniques described above. Database information may be transmitted to the indexer 994, which may provide an index of information available in the database 990 to file servers 986. The QFS 992 or other suitable filesystem may serve as a rapid-access file system for storing and accessing information available within the pod 944. The QFS 992 may support volume management capabilities, allowing many disks to be grouped together into a file system. The QFS 992 may communicate with the database instances 990, content search servers 968 and/or indexers 994 to identify, retrieve, move, and/or update data stored in the network file systems (NFS) 996 and/or other storage systems.

In some implementations, one or more query servers 982 may communicate with the NFS 996 to retrieve and/or update information stored outside of the pod 944. The NFS 996 may allow servers located in the pod 944 to access information over a network in a manner similar to how local storage is accessed. Queries from the query servers 922 may be transmitted to the NFS 996 via the load balancer 928, which may distribute resource requests over various resources available in the on-demand database service environment 900. The NFS 996 may also communicate with the QFS 992 to update the information stored on the NFS 996 and/or to provide information to the QFS 992 for use by servers located within the pod 944.

In some implementations, the content batch servers 964 may handle requests internal to the pod 944. These requests may be long-running and/or not tied to a particular customer, such as requests related to log mining, cleanup work, and maintenance tasks. The content search servers 968 may provide query and indexer functions such as functions allowing users to search through content stored in the on-demand database service environment 900. The file servers 986 may manage requests for information stored in the file storage 998, which may store information such as documents, images, basic large objects (BLOB s), etc. The query servers 982 may be used to retrieve information from one or more file systems. For example, the query system 982 may receive requests for information from the app servers 988 and then transmit information queries to the NFS 996 located outside the pod 944. The ACS servers 980 may control access to data, hardware resources, or software resources called upon to render services provided by the pod 944. The batch servers 984 may process batch jobs, which are used to run tasks at specified times. Thus, the batch servers 984 may transmit instructions to other servers, such as the app servers 988, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 10:
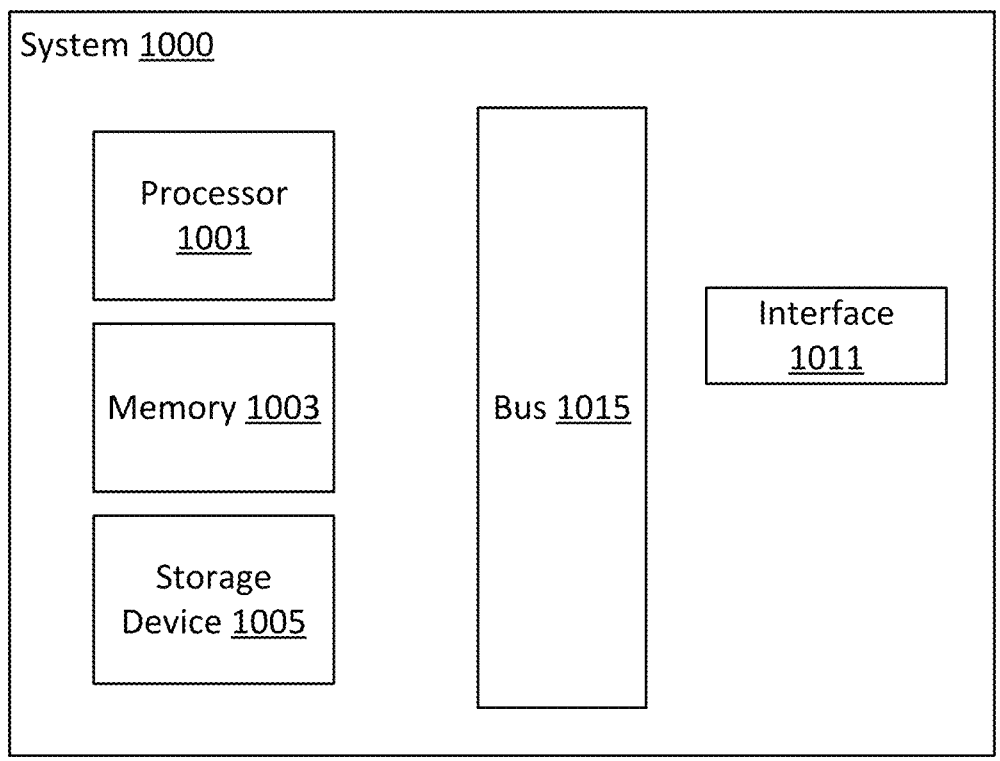
FIG. 10 illustrates one example of a computing device.

FIG. 10 illustrates one example of a computing device. According to various embodiments, a system 1000 suitable for implementing embodiments described herein includes a processor 1001, a memory module 1003, a storage device 1005, an interface 1011, and a bus 1015 (e.g., a PCI bus or other interconnection fabric.) System 1000 may operate as variety of devices such as an application server, a database server, or any other device or service described herein. Although a particular configuration is described, a variety of alternative configurations are possible. The processor 1001 may perform operations such as those described herein. Instructions for performing such operations may be embodied in the memory 1003, on one or more non-transitory computer readable media, or on some other storage device. Various specially configured devices can also be used in place of or in addition to the processor 1001. The interface 1011 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A method comprising:
    receiving, by a computing device, an input file, wherein the input file includes a plurality of entries, wherein different entries are associated with a different geographic region characteristic;
    selecting, by the computing device, a guide for entries of the plurality of entries by determining a respective geographic region characteristic stored with the entry, wherein a guide includes guidelines for formatting content in the respective entry in the plurality of entries according to guidelines of a geographic region;
    inputting, by the computing device, an image from the entry into a model trained to generate image variations of the image by varying a characteristic of the image, wherein the image variations depict variations of the image and are not included in the input file;
    determining, by the computing device, bounding boxes for placing text in the image and the image variations, wherein bounding boxes are determined for the image and the image variations based on respective content of the image and the image variations;
    analyzing, by the computing device, the image and the image variations with respective bounding boxes to place text items from the entry in the image and the image variations, wherein the text items are formatted in the image and the image variations based on the guidelines of the geographic region in the guide for the entry;
    generating, by the computing device, a plurality of design variants for the entry based on the image and the image variations that include the text items; and
    determining, by the computing device, information inserted in the input file indicating image variations or text items that are reusable for another entry in the plurality of entries with a different geographic region characteristic, wherein the image variations or text items are reused to generate design variants for the another entry.

2. The method of claim 1, wherein the input file associates an image and a text item for the entry.

3. The method of claim 1, wherein a plurality of design variants for the entry is generated automatically upon receiving the input file.

4. The method of claim 1, wherein selecting the guide comprises:
    receiving a selection of the guide from a user for an entry or automatically determining the guide for the entry.

5. The method of claim 1, wherein analyzing the image comprises:
    analyzing an object in the image; and
    generating the image variations of the image based on a position of the object in the image.

6. The method of claim 5, wherein analyzing the image comprises:
    automatically cropping the image in different ways based on the object.

7. The method of claim 6, wherein analyzing the image comprises:
    generating the image variations using a generative adversarial network that:
    receives the image and a plurality of random numbers;
    generates a number of candidate image variations; and
    selects a portion of the number of candidate image variations as the image variations.

8. The method of claim 1, wherein determining bounding boxes comprises:
    inputting the image and image variants into a second model that detects objects in the image and image variants and generates bounding boxes for the image and the image variants, wherein a bounding box that covers an object is not determined as a bounding box for the image or image variants.

9. The method of claim 8, wherein analyzing the image and the image variations to place text items comprises:
    inserting the text item in the bounding box in the image and the image variations.

10. The method of claim 9, wherein analyzing the image and the image variations to place text items comprises:
    varying the format of the text items in the image and the image variations.

11. The method of claim 1, wherein the design variants for different entries in the plurality of entries are formatted differently based on respective geographic regions in the guides for the entries.

12. The method of claim 1, wherein:
    the image and the image variations are generated in a first batch of processing, and
    after generating the image and the image variations in the first batch of processing, placing text items in the image and the image variations in a second batch of processing.

13. The method of claim 1, further comprising:
    generating a plurality of design variants for other entries in the plurality of entries in parallel with the entry based on receiving the input file, wherein the other entries are associated with respective geographic regions in the guides.

14. The method of claim 1, further comprising:
    receiving feedback for a design variant in the plurality of design variants; and
    adjusting logic that is used to create design variants based on the feedback.

15. The method of claim 1, further comprising:
    outputting the plurality of design variants; and
    receiving a selection of a design variant for the entry to use in creating content for the entry.

16. The method of claim 1, wherein:
    entries in the plurality of entries are associated with different geographic regions; and
    a respective guide for the entry is associated with a brand.

17. A non-transitory computer-readable storage medium having stored thereon computer executable instructions, which when executed by a computing device, cause the computing device to be configurable to cause:
    receiving an input file, wherein the input file includes a plurality of entries, wherein different entries are associated with a different geographic region characteristic;
    selecting a guide for entries of the plurality of entries by determining a respective geographic region characteristic stored with the entry, wherein a guide includes guidelines for formatting content in the respective entry in the plurality of entries according to guidelines of a geographic region;

inputting an image from the entry into a model trained to generate image variations of the image by varying a characteristic of the image, wherein the image variations depict variations of the image and are not included in the input file;

determining bounding boxes for placing text in the image and the image variations, wherein bounding boxes are determined for the image and the image variations based on respective content of the image and the image variations;

analyzing the image and the image variations with respective bounding boxes to place text items from the entry in the image and the image variations, wherein the text items are formatted in the image and the image variations based on the guidelines of the geographic region in the guide for the entry;

generating a plurality of design variants for the entry based on the image and the image variations that include the text items; and determining information inserted in the input file indicating image variations or text items that are reusable for another entry in the plurality of entries with a different geographic region characteristic, wherein the image variations or text items are reused to generate design variants for the another entry.

18. The non-transitory computer-readable storage medium of claim 17, wherein analyzing the image comprises:
    analyzing an object in the image; and
    generating the image variations of the image based on a position of the object in the image.

19. The non-transitory computer-readable storage medium of claim 17, wherein analyzing the image and the image variations to place text items comprises:
    determining a bounding box in the image and the image variations for a text item from the entry.

20. An apparatus comprising:
one or more computer processors; and
a computer-readable storage medium comprising instructions for controlling the one or more computer processors to be configurable to cause:

receiving an input file, wherein the input file includes a plurality of entries, wherein different entries are associated with a different geographic region characteristic;

selecting a guide for entries of the plurality of entries by determining a respective geographic region characteristic stored with the entry, wherein a guide includes guidelines for formatting content in the respective entry in the plurality of entries according to guidelines of a geographic region;

inputting an image from the entry into a model trained to generate image variations of the image by varying a characteristic of the image, wherein the image variations depict variations of the image and are not included in the input file;

determining bounding boxes for placing text in the image and the image variations, wherein bounding boxes are determined for the image and the image variations based on respective content of the image and the image variations;

analyzing the image and the image variations with respective bounding boxes to place text items from the entry in the image and the image variations, wherein the text items are formatted in the image and the image variations based on the guidelines of the geographic region in the guide for the entry;

generating a plurality of design variants for the entry based on the image and the image variations that include the text items; and determining information inserted in the input file indicating image variations or text items that are reusable for another entry in the plurality of entries with a different geographic region characteristic, wherein the image variations or text items are reused to generate design variants for the another entry.

* * * * *